United States Patent

Phillips

[15] 3,651,560

[45] Mar. 28, 1972

[54] METHOD OF MAKING A RESIN IMPREGNATED FILAMENT WOUND ARTICLE

[72] Inventor: Russell J. Phillips, Delafield, Wis.

[73] Assignee: Universal Oil Products Company, Des Plaines, Ill.

[22] Filed: June 25, 1970

[21] Appl. No.: 49,639

[52] U.S. Cl. ............................................. 29/423, 156/175
[51] Int. Cl. ..................................................... B23p 17/00
[58] Field of Search ........................ 29/423; 242/7.22, 7.23; 138/109; 156/173, 174, 175

[56] References Cited

UNITED STATES PATENTS 3,379,591  4/1968  Bradley.................................156/173
3,519,520  7/1970  Newman, Jr.......................156/173 X Primary Examiner—John F. Campbell
Assistant Examiner—Victor A. Di Palma
Attorney—James R. Hoatson, Jr. and Philip T. Liggett

[57] ABSTRACT

An improved method of making a filament wound article. The mandrel upon which the article is filament wound is first fitted with an annular collar at an end thereof. The article is produced by winding resin impregnated filaments about the mandrel with filaments bearing against the annular collar. A mandrel extracting device is used to remove the mandrel from the filament wound article produced. The mandrel is drawn through an aperture in a pressure surface on the mandrel extracting device, the aperture having a diameter larger than that of the mandrel but smaller than the outer diameter of the annular collar. The annular collar thereby bears against the pressure surface and the annular collar and the filament wound article are forced off the mandrel.

4 Claims, 3 Drawing Figures

Patented March 28, 1972 3,651,560
2 Sheets-Sheet 1
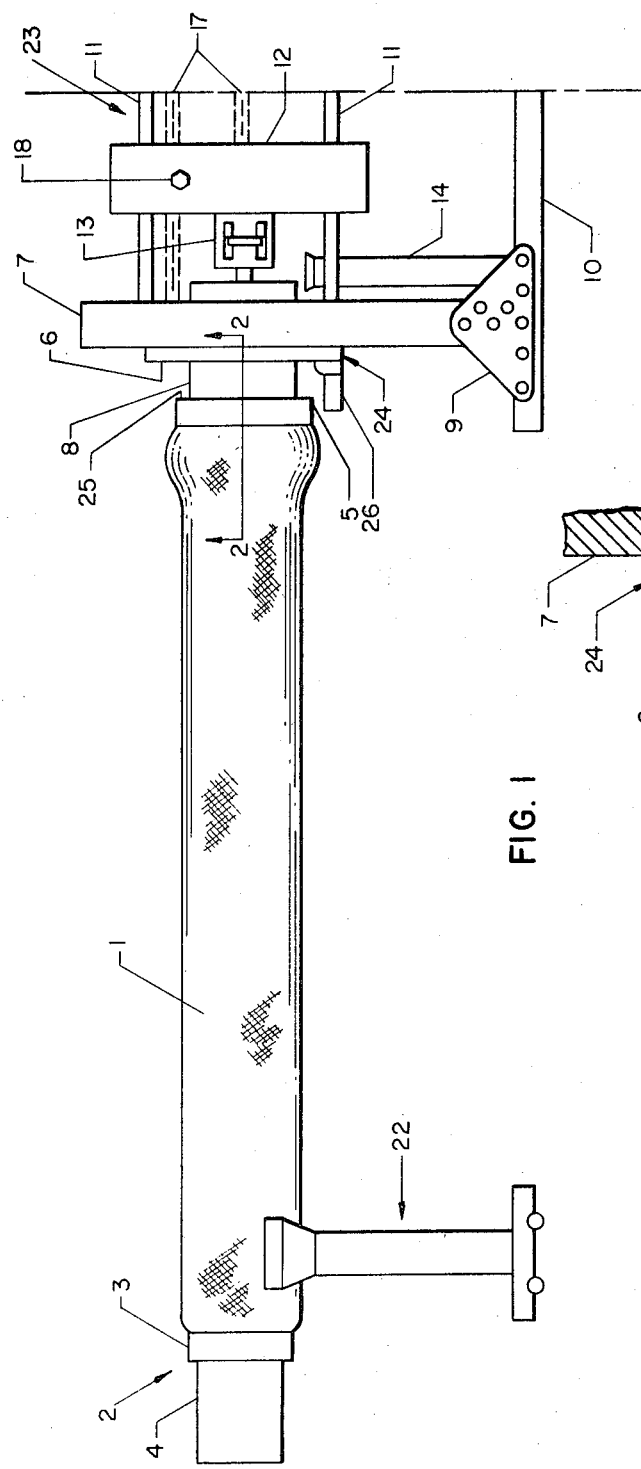
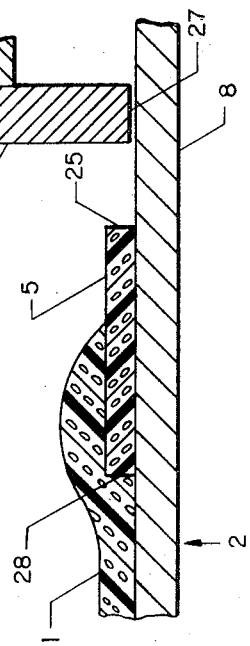
INVENTOR:
Russell J. Phillips
BY James R. Hootson Jr.
Philip T. Liggett
ATTORNEYS INVENTOR:
Russell J. Phillips

ATTORNEYS

METHOD OF MAKING A RESIN IMPREGNATED FILAMENT WOUND ARTICLE

This invention relates to an improved method of making a filament wound article. More particularly, the mandrel upon which the article is filament wound is first fitted with an annular collar at an end thereof. The article is produced by winding resin impregnated filaments about the mandrel with filaments bearing against the annular collar. A mandrel extracting device is used to remove the filament wound article produced. The mandrel is drawn through an aperture in a pressure surface on the mandrel extracting device, the aperture having a diameter larger than the mandrel but smaller than the outer diameter of the annular collar. The annular collar thereby bears against the pressure surface and the annular collar and the filament wound article are forced off the mandrel.

Currently, filament wound articles such as tubes and pipes are produced by helically winding resin impregnated filaments on a mandrel having a smooth outer surface. A cross section along the axis of the mandrel reveals that the ends of the filament wound article taper from the nominal diameter of the filament wound article to the diameter of the mandrel. That is, the walls of the filament wound article are not as thick at the very extremities of the article as at locations slightly interior thereof. The taper or slope is quite gradual and the longitudinal component of slope is much larger than the radial component. The result of this construction is that it is quite difficult to withdraw the mandrel from the filament wound article. To withdraw the mandrel, a longitudinal force must be exerted on the mandrel while an opposing longitudinal force must be exerted on the filament wound article formed thereon. Because of the low angle of taper at the ends of the article, there is no real transverse surface at an end of the article against which the requisite opposing force may be applied. Because the taper is so gradual, forces applied to the end of the filament wound article tend to be much larger in a direction normal to the mandrel surface than in a longitudinal or axial direction. As a result, an external force, though longitudinally applied to the filament wound article, increases the surface friction between the inner surface of the filament wound article and the outer surface of the mandrel, thereby making removal of the mandrel more difficult.

In an alternative manner of removing the mandrel a transverse radial cut is made at an end of the filament wound article throughout the circumference of the filament wound article. The end of the article is thereby removed and a radial or transverse surface of the filament wound article is exposed. A longitudinal force may easily be applied at this transverse surface to separate the mandrel from the filament wound article. This alternative method poses problems, however, in that it requires an additional work operation after the filament wound article is cured and prior to its removal from the mandrel. Furthermore, damage to the mandrel resulting from an excessively deep cut through the filament wound article is quite a common occurrence. The surface of the mandrel becomes scratched and scored where the cutting blade, after passing through the filament wound article, contacts the mandrel.

Accordingly, it is an object of this invention to create a transverse surface at an end of a filament wound article which can be used to force the article off the mandrel. This transverse surface is formed without an additional manufacturing operation after the resin used to form the article is cured and prior to removal of the mandrel.

A further object is to protect the mandrel while producing a transverse surface at an end of the filament wound article. Scoring or scratching of the mandrel in order to remove the article is eliminated by the method of this invention.

Scoring and scratching of the inner surface of the filament wound article is also reduced by another feature of a preferred manner of performing the invention. At the end of the mandrel, opposite the end to first be pulled axially away from the filament wound article, there is a second mandrel end having a reduced diameter. This reduction in diameter at the mandrel end may be abrupt or gradual, but in any case serves to preserve the inner surface of the filament wound article. Because this second or opposite end of the mandrel has a reduced diameter, spilled bits of resin that have cured and adhered to the mandrel end do not come in contact with the inner surface of the filament wound article as the second mandrel end is dragged through the length of the filament wound article. This feature eliminates the necessity for frequently cleaning the mandrel surface after curing and prior to removal of the mandrel.

Another object of this invention is to provide an effective means of mandrel removal at a low cost. Scrap pieces of filament wound pipe or tubing are used to form the transverse surface against which a force can be applied to separate the filament wound article from the mandrel. This means the cost increase due to the practice of this invention is practically nothing.

In a broad aspect this invention is, in a method of making a resin impregnated filament wound article on a reusable mandrel utilizing an annular collar and a mandrel extracting device having a pressure surface defining an aperture therein of dimensions greater than the transverse dimensions of said mandrel and less than the outer transverse dimensions of said annular collar, the improvement comprising positioning said annular collar about said mandrel at an end thereof, winding filaments about said mandrel to bear against said collar, and removing said resin impregnated filament wound article from said mandrel by drawing said mandrel through said aperture with said pressure surface bearing against said annular collar.

This invention may be more fully illustrated by reference to the accompanying drawings.

FIG. 1 is a side elevational view of a filament wound pipe formed on a mandrel connected to a mandrel extracting device for removal of the mandrel.

FIG. 2 is an enlarged cross-sectional view of a portion of FIG. 1 taken along the lines 2—2.

Figure 3:
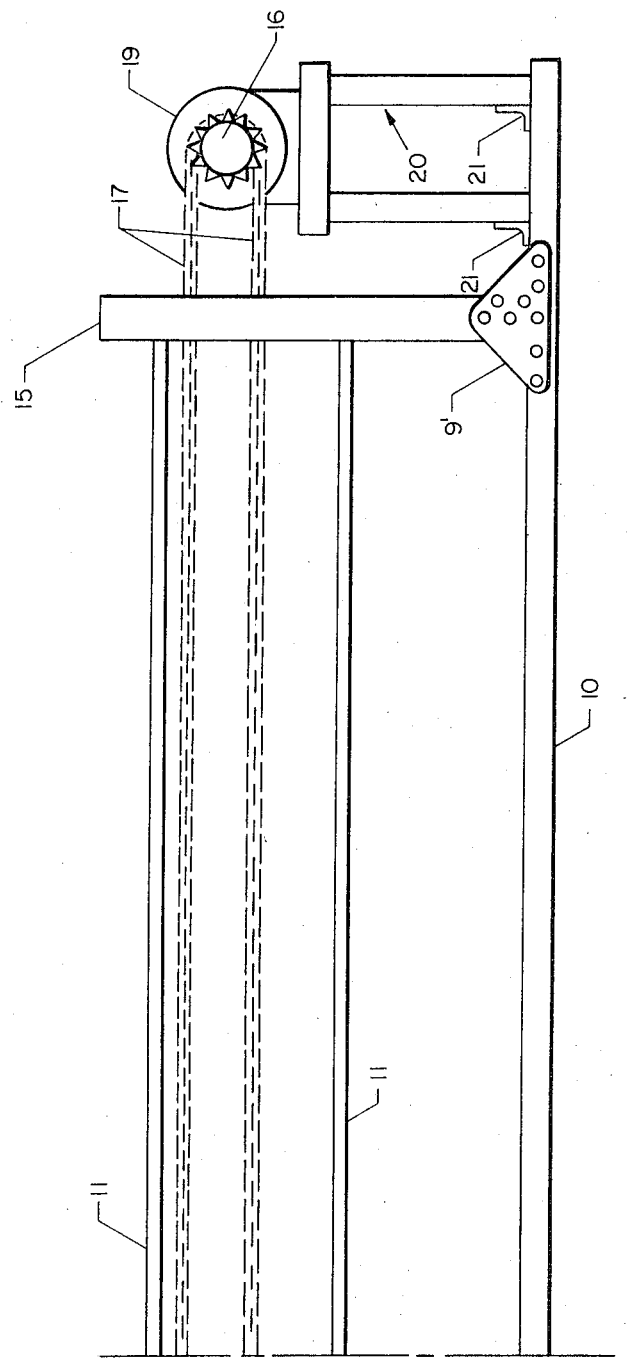
FIG. 3 is a rightward extension of FIG. 1 showing additional details of the mandrel extracting device.

Referring now to FIG. 1, a resin impregnated glass filament wound article 1 is shown positioned on a mandrel indicated generally at 2. A first end 8 of the mandrel 2 is connected to the carriage 12 of a mandrel extracting device, indicated generally at 23, by means of a conventional coupling device 13. With reference to FIGS. 1 and 3, the mandrel extracting device 23 is comprised of a base 10 and upright stanchions 7 and 15 at the front and rear respectively on each side of the mandrel extracting means. The stanchions are held in place by means of gusset plates 9 and 9'. Carriage 12 traverses lengthwise between the stanchions 7 and 15 and is restricted to longitudinal motion by means of guide bars 11 which pass through longitudinal holes in carriage 12 and are fastened to the stanchions 7 and 15. In operation carriage 12 travels from left to right in the drawing carrying with it the mandrel 2. Operation of the mandrel extracting device 23 occurs when a longitudinal force is applied to the carriage 12 by the power motor 19. Power motor 19 is supported by a stand 20 secured to base 10 by means of angles 21. Power motor 19 turns a drive sprocket 16. A follower sprocket (hidden from view) is located at the other end of the mandrel extracting device 23 behind a front stanchion 7. Carriage 12 is secured to a fixed point on the chain 17 by a bolt assembly 18 which passes through a link in the chain 17. When the power motor 19 drives the sprocket 16 in a clockwise direction, the carriage 12 is pulled toward stanchions 15 by chain 17, carrying with it the mandrel 2. The mandrel 2 is thereby extracted from the filament wound article 1 which is depicted as a pipe.

The filament wound pipe 1 is produced on reusable mandrel 2 which has a first end 8, a central portion 3, and a second end 4. Second end 4 has a diameter that is reduced from the diameter of central portion 3 and first end 8. As the mandrel is extracted from the filament wound pipe, the reduced diameter of second end 4 permits the mandrel to be drawn through the pipe without scoring of the inner surface of the filament wound pipe 1 due to miscellaneous deposits or drippings of resin on second end 4. Scoring and scratching of the inner surface of filament wound pipe 1 due to deposits of resin thereon is prevented since the resin deposits are never in contact with the inner surface of the pipe.

Mandrel extracting device 23 is equipped with a pressure plate 24 having a forward pressure surface 6. Pressure plate 24 is mounted across the front of the mandrel extracting device 23 and held in place by stanchions 7. Pressure surface 6 defines an aperture 27 through pressure plate 24. The dimensions of the aperture 27 are greater than the diameter of the mandrel 2 at first end 8 and are less than the outer diameter of an annular collar 5 positioned about the mandrel 2 at the end 8. This is best illustrated in FIG. 2.

The filament wound pipe 1 is produced by first positioning collar 5 on end 8 of mandrel 2. Resin impregnated glass filaments are then helically wound about mandrel 2 as mandrel 2 rotates. The process prior to curing for producing filament wound pipe 1 differs from that conventionally practiced only in that the annular collar 5 is positioned about the mandrel 2 at end 8 prior to filament winding. The resin impregnated filaments are wound about the mandrel 2 so as to bear against the collar 5. Annular collar 5 has a surface 25 perpendicular to the mandrel axis. The pressure surface 6 of the mandrel extracting device 23 bears against the surface 25 of collar 5 when the mandrel 2 is to be withdrawn from filament wound pipe 1.

From FIG. 2 it can be seen that the collar 5 is partially trapped between the filaments and the mandrel 2 by the filaments after filament winding. As alternative, the filaments could bear only against a rear surface 28 of collar 5 transverse to the mandrel axis, or they could cover collar 5 almost completely, with the exception of forward transverse surface 25.

After filament winding, the resin cures to form a filament wound pipe 1. This filament wound pipe 1 is removed from the mandrel 2 by drawing the mandrel 2 through the aperture 27 in the pressure plate 24 with the pressure surface 6 bearing against the surface 25 of annular collar 5. Force is exerted when power motor 19 is actuated and the carriage 12 moves toward the stanchions 15, carrying the mandrel 2 with it. From FIG. 2 it can be seen that the mandrel 2 may be drawn through the aperture 27, but that the surface 25 of the annular collar 5 blocks the annular collar 5 and prevents it from passing through the aperture 27. This pressure on the annular collar 5 forces the filament wound pipe 1 to remain stationary while the mandrel 2 is moved to the right in FIG. 1.

There is a rolling support 22 which supports one end of the mandrel and the filament wound article as the withdrawal of the mandrel is initiated. After withdrawal of the mandrel 2 is complete, rolling support 22 supports one end of the filament wound article 1 while the other end is supported by ledge 26 extending outward from pressure plate 24. A support 14 mounted on base 10 catches and supports end 4 of mandrel 2 as end 4 is withdrawn from filament wound article 1. Once the filament wound pipe 1 is separated from the mandrel 2, the end of the pipe 1 including the collar 5 are severed from the pipe and the pipe is ready for use.

The chain drive system of mandrel extracting device 23 for withdrawing the mandrel 2 is quite simple in design for purposes of illustration. More elaborate chain drive or other withdrawal systems may be employed to a greater mechanical force advantage. Once the mandrel 2 is withdrawn, the mandrel 2 is removed from the mandrel extracting device 23. The carriage 12 is then returned to the extreme left of the mandrel extracting device 23, and the device is ready for extraction of another mandrel.

I claim as my invention:

1. In a method of making a resin impregnated filament wound article on a reusable mandrel utilizing an annular collar having a rear transverse surface and a mandrel extracting device having a pressure surface defining an aperture therein of dimensions greater than the transverse dimensions of said mandrel and less than the outer transverse dimensions of said annular collar, the improvement comprising positioning said annular collar about said mandrel at an end thereof, winding filaments about said mandrel to bear at least against said rear transverse surface of said collar, and removing said resin impregnated filament wound article from said mandrel by drawing said mandrel through said aperture with said pressure surface bearing against said annular collar.

2. The method of claim 1 further characterized in that said collar is partially entrapped between said filaments and said mandrel after filament winding.

3. The method of claim 1 further characterized in that said annular collar has a surface perpendicular to the mandrel axis that is positioned against said pressure surface of said mandrel extracting device during removal of said filament wound article.

4. In a method of making a resin impregnated filament wound article on a reusable mandrel having a first end, a central portion, and a second end of reduced diameter, and utilizing an annular collar having a rear transverse surface and a mandrel extracting device having a pressure surface defining an aperture therein having a diameter greater than the diameter of said mandrel and less than the outer diameter of said annular collar, the improvement comprising positioning said annular collar about said first end of said mandrel, winding filaments about said mandrel to bear at least against said rear transverse surface of said collar, and removing said resin impregnated filament wound article from said mandrel by drawing said mandrel through said aperture with said pressure surface bearing against said annular collar, whereby said second end of said mandrel is drawn through said filament wound article and the reduced diameter of said second end reduces scoring and scratching of the inner surface of said filament wound article from deposits of resin on said second end of said mandrel.

* * * * *